United States Patent [19]

Leber

[11] 4,270,647
[45] Jun. 2, 1981

[54] LUBRICATING OIL FLOW CONTROL DEVICE, ESPECIALLY FOR A SPEED-CHANGE TRANSMISSION OPERATING IN AN OIL BATH

[75] Inventor: Fritz Leber, Friedrichshafen, Fed. Rep. of Germany

[73] Assignee: Zahnradfabrik Friedrich-Shafen Aktiengesellschaft, Friedrichshafen, Fed. Rep. of Germany

[21] Appl. No.: 4,990

[22] Filed: Jan. 19, 1979

[30] Foreign Application Priority Data

Jan. 28, 1978 [DE] Fed. Rep. of Germany ....... 2802676

[51] Int. Cl.³ ............................................. F16D 13/60
[52] U.S. Cl. ................................................. 192/113 B
[58] Field of Search ........................ 192/113 B, 113 R

[56] References Cited

U.S. PATENT DOCUMENTS

| | | | |
|---|---|---|---|
| 2,837,192 | 6/1958 | Dunkelow | 192/113 B X |
| 3,063,531 | 11/1962 | Aschauer | 192/113 B |
| 3,099,166 | 7/1963 | Schou | 192/113 B X |
| 3,202,253 | 8/1965 | Merritt | 192/113 B |
| 3,351,169 | 11/1967 | McIndoe | 192/113 B X |
| 3,391,767 | 7/1968 | Stow | 192/113 B X |
| 3,823,801 | 7/1974 | Arnold | 192/113 B X |
| 3,834,503 | 9/1974 | Maurer | 192/113 B |
| 3,913,616 | 10/1975 | Horsch | 192/113 B |
| 3,938,631 | 2/1976 | Smith | 192/113 B X |
| 4,004,670 | 1/1977 | Nerstad | 192/113 B X |

*Primary Examiner*—Nile C. Byers, Jr.
*Attorney, Agent, or Firm*—Karl F. Ross

[57] ABSTRACT

A lubricating oil flow control device, especially for a speed change transmission operating in an oil bath, has a clutch actuator which is shiftable along the periphery of a shaft provided with an oil passage individual to the clutch or operating the latter. This actuating plate has an axially extending sleeve which obstructs a radial bore in the shaft in the unactuated position of the clutch and thereby limits the flow of oil to the clutch plate or lamella. In another operating position of the actuating plate, the bore is unobstructed and provides, e.g. via holes in the sleeve and in a sleeve of a gear to which the clutch can connect the shaft, a substantially direct flow path to the center of the clutch in an unobstructed manner.

1 Claim, 5 Drawing Figures

LUBRICATING OIL FLOW CONTROL DEVICE, ESPECIALLY FOR A SPEED-CHANGE TRANSMISSION OPERATING IN AN OIL BATH

FIELD OF THE INVENTION

The present invention relates to a lubricating oil flow control device, especially for a speed-change transmission operating in an oil bath and, more particularly, to a control for the supply of lubricating oil to a clutch or like member connecting a driven member such a gear with a shaft provided with an oil passage individual to that clutch.

BACKGROUND OF THE INVENTION

It is known to provide speed-change transmissions with speed-selection clutches which operate in an oil bath or housing and which are provided with passages enabling lubricating oil to be supplied to the clutch at least during the actuation thereof. For example, German Federal Patent Publication (open application or Offenlegungsschrift) DT-OS No. 2,215,922 (see U.S. Pat. No. 3,834,503) provides a control member or system for the supply of lubricating oil to a speed-selection clutch of the latter type which is controlled in response to the input speed.

In this system and in accordance with one of the embodiments of the arrangements described therein, it has already been proposed to provide a separate oil flow which is independent of any fluid displacement during clutch application, for cooling and lubricating the stacks of clutch lamellae. The distribution and feed of the oil is effected through a plurality of valve members which are provided with locking disks and pins forming slide valves.

In this system, however, it is not possible to ensure effective distribution as well as a quantity of lubricant in accordance with heat developed by the clutch.

Furthermore, earlier systems for metering the lubricating and cooling oil to such clutches have a large number of components especially provided for the metering purpose and requiring small tolerances during fabrication if proper functioning is to be achieved. The systems are not conductive to mass production because they require high fabricating precisions and are not readily accessible for maintenance and repair.

More generally, the earlier systems are neither economically nor functionally satisfactory and cannot be considered reliable over long periods of use. They do not minimize effectively the lubricating oil flow during inoperative conditions of the clutch so that relatively large amounts of oil must be displaced even though lubrication is not as necessary. In fact, most earlier systems maintain a practically constant flow of oil independent of the lubricating needs of the clutch.

Mention can also be made of the fact that earlier clutches with oil flow control have the significant disadvantage that the lubricating or cooling of the clutch during the nonactuated state and during the start of clutch actuation is effected with relatively low pressure. Separate means is generally provided for actuating the clutch and such means is usually totally independent of the oil flow. The actuation, for example, may be effected by means of an annular piston which is axially shifted by the supply of a hydraulic fluid separate from the oil flow and which acts against a restoring spring urging the annular piston into its disengaged position. The use of such springs, annular pistons and like members in these systems has created problems with respect to the spring itself, because of material fatigue, and the guides for the cylinders which may bind in a hot state of the clutch, especially if the lubricant flow is not sufficient. In addition, many constructions make it difficult to provide a sufficiently large or stiff spring for uniformly pressing the piston back into its starting position because of the desire for overall compact construction of the device.

OBJECTS OF THE INVENTION

It is the principal object of the present invention to provide an improved lubricating oil flow control device for a speed-control member, especially a clutch, in a speed-change transmission operating in an oil bath and particularly for coupling a gear with a shaft.

Another object of this invention is to provide a lubricating oil flow control device which has a minimum number of moving parts, wherein the parts are of relatively simple construction, and which is free from the fabrication, maintenance and repair problems hitherto encountered.

Yet another object of the invention is to provide an improved means of controlling a clutch-actuating plate in a system of the aforedescribed type.

It is also an object of this invention to provide a highly compact but efficiently operating clutch both with respect to the supply of lubricating and cooling fluid thereto and with respect to activation and deactivation of the clutch.

Still another object of the invention is to provide a system for the purposes described which is free from the above-mentioned disadvantages of earlier systems and others which will be discussed below.

SUMMARY OF THE INVENTION

These objects and others which will become apparent hereinafter are attained, in accordance with the present invention, in a lubricating oil flow control device for a clutch system, or a clutch system itself, especially for a speed-change transmission operating in an oil bath, which comprises a shaft provided with a lubricating oil passage and a transverse, preferably radial, bore which communicates with this oil passage and opens at the periphery of the shaft. A driven member, e.g. a gear, is rotatable relative to the shaft and preferably upon the latter adjacent this periphery which has been mentioned previously. The driven member has an axially extending entraining sleeve spaced from but surrounding the periphery of the shaft with an all-around clearance.

The clutch mounted on the shaft includes clutch lamellae which are compressible to couple the driven member or gear rotatably with the shaft, a clutch element which can be frictionally engaged by the lamella and is axially shiftable on and rotatably coupled with the entraining sleeve, and a pressure plate axially shiftable on the shaft for compressing the lamella.

According to a feature of the invention, the clutch element may be internally splined and can constitute a clutch plate which is guided on the axial spline on the external periphery of the entraining sleeve.

Essential to the invention, moreover, is an axially bidirectionally shiftable actuating plate on the shaft, preferably between a flange and the pressure plate of the clutch, for actuating the latter pressure plate.

The annular flange which is fixed to the shaft can be provided with external guides rotatably entraining the pressure plate with the shaft, can form an annular cylinder of which the actuating plate constitutes a piston for actuating the clutch, and can carry the clutch members apart from the aforementioned clutch element which engages the entraining sleeve.

According to the invention, the actuating plate is provided with a control sleeve projecting axially from the actuating plate and surrounding the periphery of the shaft. The control sleeve defines in one axial position of the lubricating plate a relatively large flow cross section for lubricating oil from the bore and in another axial position of the actuating plate a substantial obstruction to flow from the bore.

The control sleeve preferably extends between the entraining sleeve and the periphery of the shaft while the entraining sleeve can have at least one opening feeding oil to the clutch in at least one position of the actuating plate.

According to an important feature of the invention, the control sleeve is provided along its periphery with angularly equispaced openings which, in the "bust" position of the control sleeve mentioned above, provide a substantially direct path between the bore and the center of the clutch, i.e. a direct flow path to the clutch lamella. The entraining sleeve may be provided with angularly equispaced bores that lie in the same plane perpendicular to the axis as the axes of the bores in the control sleeve (in this first position) and the radial bore in the shaft.

Furthermore, the aforementioned periphery of the shaft can define with the control sleeve an annular passage with which the shaft bore communicates, this annular passage forming a manifold supplying the radial bores in the control sleeve which, in turn, can open into an annular passage between the entraining sleeve and the control sleeve. The latter annular passage, in turn, communicates with the bores or openings in the entraining sleeve to act as a manifold distributing the lubricating oil to the latter bores and feeding the oil preferably to the center of the lamella stacks. A preferably direct outflow is thus provided in the radial direction, i.e. in the radial plane mentioned previously.

According to a feature of the invention, the annular flange is formed as the aforementioned cylinder, having an external crown or a cylindrical portion with which the actuating plate cooperates in a piston-and-cylinder arrangement. A separate bore through the shaft communicates with the working chamber between the flange and the actuating plate for hydraulic displacement of the actuating plate to engage the clutch and for simultaneously shifting the actuating plate and the control sleeve between the "one" position mentioned previously and the "other" position of this actuating plate. In this embodiment, the hydraulic fluid supplied to the chamber actuates the clutch while the lubricating fluid delivered through the radial bore and the lubricating oil flow passage mentioned previously acts in the opposite sense to restore the actuating plate into its inoperative position, i.e. to disengage the clutch and at the same time at least partially obstruct the outflow from the shaft bore.

The system for feeding lubricating oil to the clutch just described provides a greatly simplified construction of the flow control means as well as the clutch structure and ensures a reduced throughput of the lubricating oil during the unactuated condition of the clutch while improving the supply and distribution of the oil when it is delivered to the clutch in the reduced quantity during deactivation or in increased quantity during operation of the clutch. Maintenance requirements are reduced, the cost of the system is substantially lower than with the multi-part arrangements previously used, and practically no additional moving parts are required compared to the number normally present for clutch operation. The parts need not be fabricated with extreme precision and this again reduces both the problems of wear and cost.

The principles of the present invention can be used for all oil-cooled clutches, especially clutches operating in oil baths, regardless of the type of actuation used for the actuating plate. However, the hydraulic actuation and the restoration by means of the lubricating oil are preferred.

According to an important feature of the invention, the control sleeve is provided with a surface which overlies substantially all of the flow cross section of the radial bore or, alternatively, defines with the shaft an annular flow passage which is practically obstructed in the "other" position of the control sleeve. For example, the control sleeve may be provided with an annular edge which practically closes on the corresponding edge of the shaft in the "other" position of the control sleeve but, upon displacement from this edge, opens an annular flow cross section through which the annular chamber surrounded by the control sleeve communicates with the annular space surrounded by the entraining element. Here again an improved distribution of the fluid is ensured and the bores in the control sleeve can be dispensed with. Naturally, the outflow in the "other position" of the control sleeve need not be zero but can depend upon the lubricating requirements of the clutch in its inactive state. Unnecessary displacement of the lubricating oil and energy or efficiency loss because of it can be thus reduced.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
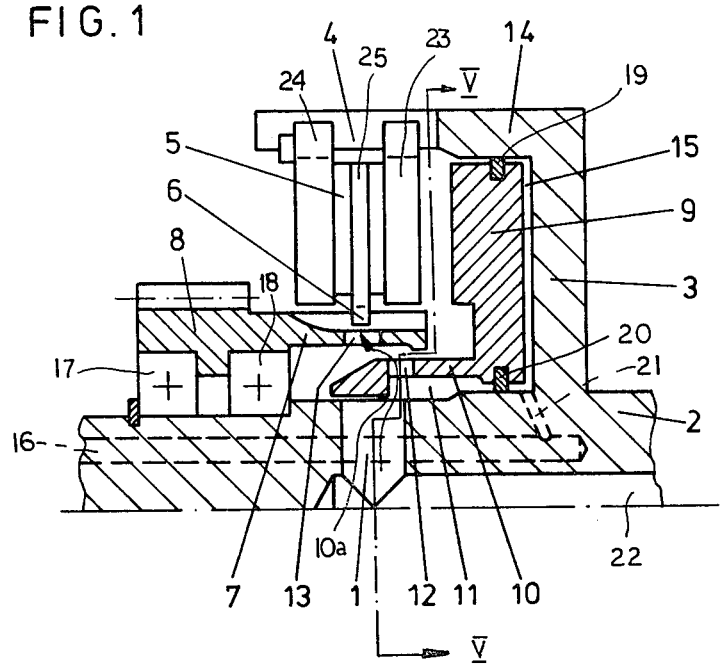
FIG. 1 is an axial cross-sectional view of a portion of a flow-control and clutch device according to the invention with the clutch being illustrated in its unactuated state.
Figure 2:
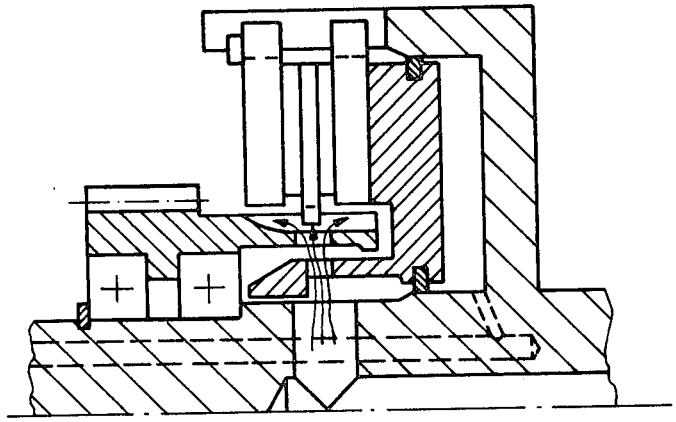
FIG. 2 is a view similar to FIG. 1 showing the positions of the elements in the actuated state of the clutch.
Figure 5:
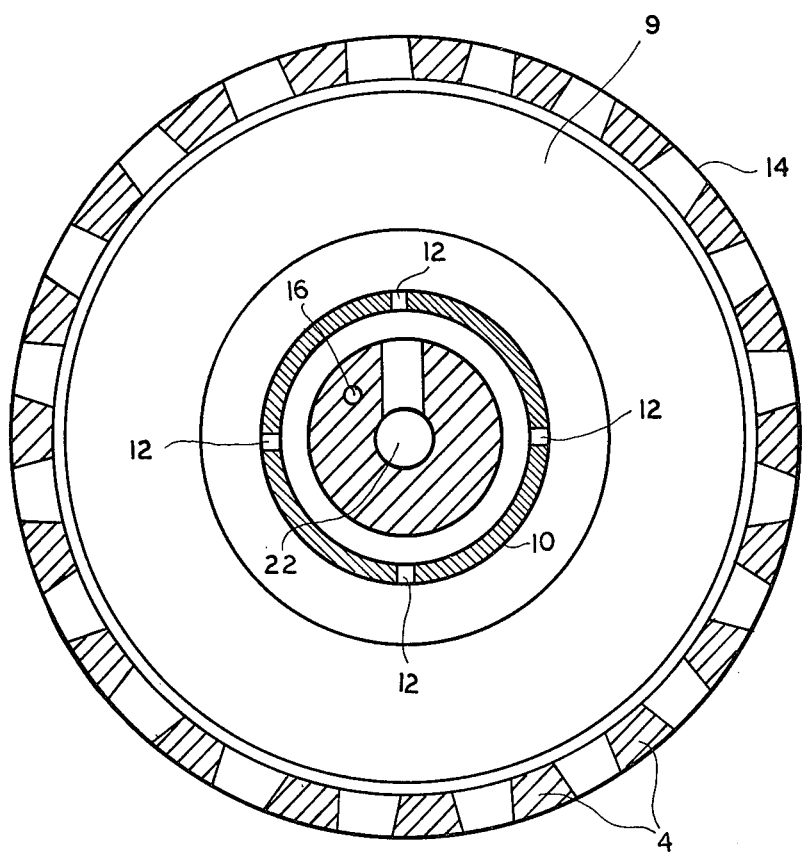
FIG. 5 is cross-sectional view along the line V—V of FIG. 1.

In FIGS. 1, 2 and 5 of the drawing, I have shown a lubricating oil feed controller for a clutch in which the lubricating oil is supplied via a passage 22 in a shaft 2 communicating with a bore 1 extending radially of the shaft and opening along its periphery. The shaft 2 is provided with an annular flange 3 formed with a cylinder 14 along its external periphery. The cylinder 14 is constituted with an entraining crown 4 of splines (see FIG. 5) which axially guides pressure plate 23 of a clutch. The clutch comprises a fixed plate 24, lamella stacks 5 and an element 25 which is formed internally with recesses 6 guided in the splines of an entraining sleeve 7.

The entraining sleeve 7 is formed unitarily with a driven member 8 in the form of a gear forming part of the transmission and journaled by bearings 17, 18 upon the shaft 2 so as to be rotatable relatively thereto.

An actuating plate 9 is shiftable in the cylinder 14 upon pressurization of the chamber 15 between this plate and the flange 3 via hydraulic fluid delivered by a passage 16 and a bore 21 to the chamber 15. The chamber 15 is sealed relative to the actuating plate 9 by seals 19 and 20 so that the member 9 constitutes an annular piston.

For actuation of the clutch, the plate 9 is driven to the left (compare FIGS. 1 and 2), thereby pressing the pressure plate 23 against the lamella stacks 5 and clamping frictionally the element 25 to the shaft 2. The gear 8 is thereby entrained with the shaft.

In the unactuated state of the clutch (FIG. 1), the element 25 slips relative to the shaft and the gear 8 is not entrained.

According to the invention, the actuating plate 9 is provided with a control sleeve 10 which extends axially over the bore 1 and at least partially obstructs the latter in the unactuated position of the clutch (FIG. 1), thereby limiting the outflow of lubricating oil to the clutch. As shown by the arrow in FIG. 1, this limited flow of lubricating oil can pass from the annular passage 11 defined between the sleeve 10 and the periphery of the shaft 2 through a plurality of radial bores 12 in the control sleeve 10 into the annular chamber defined within the entraining sleeve 7 beneath which the control sleeve 10 extends.

The entraining sleeve 7 is provided with radial passages 13 opening practically centrally of the lamella stacks 5 to feed the lubricating oil thereto.

The control sleeve 10 is provided with an edge 10a which shifts relative to the bore 1 to unblock or block the latter. As can be seen from FIG. 2, in the actuated position of the clutch, the bores 12 and 13 are practically radially aligned with the bore 1 and the flow cross section is at its maximum so that the lubricating oil flows practically in a direct radial stream to the center of the lamella stacks.

While any means for displacing the actuating plate 9 can be used, I prefer to employ a hydraulic displacement via pressurization of the compartment 15. Naturally, the return of the actuating plate 9 to the right can be effected by springs although it is an important feature of the invention that this return be effected at least in part by the pressurization of the chamber 11 so that the lubricating oil can be used to drive the annular piston to the right.

Figure 3:
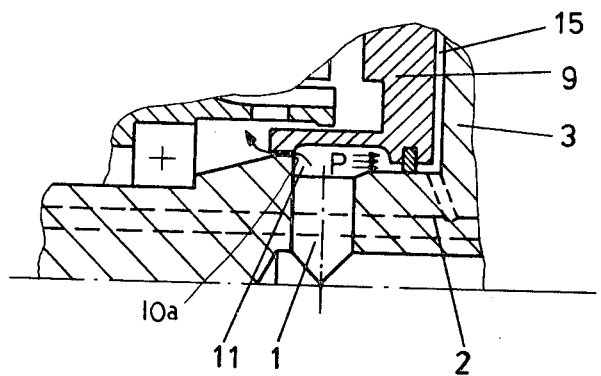
FIG. 3 is a cross-sectional view of a portion of a device otherwise similar to that of FIGS. 1 and 2 in accordance with a modification.
Figure 4:
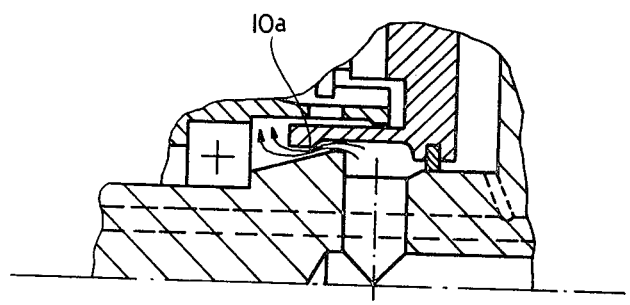
FIG. 4 is a view of this modification, also in axial section, with the parts in another position.

Another embodiment of the invention has been shown in FIGS. 3 and 4 in which the sealing edge 10a of the sleeve 10 of plate 9 cooperates with an edge of the shaft to limit the outflow (FIG. 3) in the unactuated position of the clutch. As can be seen here, the pressure developed in the chamber 11 because of the throttled outflow of lubricating oil can be used to retain the annular piston 9 in the extreme righthand position. Even in this position, however, a minor flow of lubricating oil reaches the lamella stacks in the manner described. When, however, the chamber 15 is pressurized (FIG. 4) the annular gap between the shaft and the sealing edge 10a is increased so as to allow a greater flow of lubricating oil to the clutch.

Naturally, in this embodiment, the restoring force upon the actuating plate 9 is developed by the lubricating oil so that it displaces the annular piston 9 into its disengaged position when chamber 15 is depressurized.

The control sleeve 10 has been found also to provide an effective guide function for the annular piston 9 so that the latter does not tend to be canted by vibration or the like as is the case when restoring springs are provided. Vibration effects are thereby reduced.

The system of the present invention has the following advantages:

The control of a separate lubricating oil circuit is effected directly by the actuating piston so that there is no lag between the opening of the lubricating flow and actuation of the clutch.

Since the control sleeve forms part of the actuating plate or piston, no separate valve or auxiliary element must be installed and problems with additional moving parts are eliminated.

The valve system as well as the actuating plate operate without springs and thus the timing of valve operation, the degree of valve operation, and the duration of its operation are always coordinated precisely with the timing, degree and duration of the clutch actuation. Further, the actuating plate is restored to its inactive position by the pressure of the lubricating oil which is maintained continuously upon depressurization of the chamber 15.

Problems with respect to the deviation from synchronism because of changing spring characteristics are eliminated.

The system of the invention enables the flow cross section to be relatively large and the distribution of lubricating oil to be uniform in the actuated position of the clutch by contrast with earlier systems where both uniformity and the rate of flow may be restricted.

The joint effect of clutch closure and valve opening affords better utilization of the available forces and limits the generation of shocks or vibrations because separate valve elements are eliminated.

The overall dimensions of this system can be held relatively small since restoring springs and the like are eliminated.

The system can be used for simple clutches as well as clutches built into complex transmissions.

The number of moving parts and, in general, the number of structural elements in this system is minimized.

The machining requirements and mounting efforts are minimized by the compact system of the present invention by comparison with earlier systems.

The possibility of failure of elements of this system, because of the reduced number of active elements, is reduced.

The effect of centrifugal forces, vibration and resonance on the system is minimized because both independent valve elements and vibratory structures, including bolts and the like, are eliminated.

The power/weight ratio of the system can be increased because of the smaller number of moving parts and the overall reduction in mass afforded by the system of the invention.

The system has been found to be advantageous, moreover, because it minimizes the number of parts hitherto required for the modulated flow of lubricant to a clutch. The effect of heat on the system is minimized and the system does not occupy any more room than is normally required for a shaft, clutch and gear combination.

I claim:

1. In a lubricating-oil flow-control device for a shiftable clutch operating in an oil bath and comprising: a shaft formed with a lubricating-oil passage; an annular drive and forming an annular actuating cylinder pressurizable with a liquid medium; an annular piston slidably received in said cylinder and rotatable with said shaft while being axially shiftable upon pressurization of said cylinder relative to said shaft; a gear rotatably mounted on said shaft and having a gear sleeve extending axially toward said flange but peripherally spaced from said shaft; a lamella stack surrounding said sleeve and compressible by said piston upon axial displacement thereof upon pressurization of said cylinder by said medium to couple said gear with said flange; a bore formed transversely in said shaft and opening at the periphery of said shaft while communicating with said passage for discharging lubricating oil, the improvement wherein said device comprises:

a control sleeve formed on said piston and extending axially along said shaft within said gear sleeve and of a length sufficient to cover said bore in all positions of said control sleeve, said control sleeve having an internal edge delimiting an annular compartment formed between said control sleeve and the periphery of said shaft, said edge forming a valve partially obstructing said bore in a nonpressurized condition of said cylinder and permitting free flow from said bore upon pressurization of said cylinder with said medium to compress said lamella stack;

a plurality of uniformly spaced radial bores formed in said control sleeve distributing lubricating oil from said compartment outwardly to said gear sleeve;

a plurality of radial bores formed in cais gear sleeve for delivering lubricating oil to said lamella stack;

the bores of said shaft and said sleeve being substantially coplanar in an actuated position of said clutch with said cylinder pressurized by said medium; and a further passage formed in said shaft and communicating with said cylinder for delivering said medium thereto independently of the supply of lubricating oil through the first-mentioned passage.

* * * * *